United States Patent [19]

Naruse et al.

[11] Patent Number: 5,502,650
[45] Date of Patent: Mar. 26, 1996

[54] APPARATUS FOR ADJUSTING ROTOR

[75] Inventors: Katsuhiko Naruse, Yokohama; Shinzou Ogawa, Tokyo; Yukio Watanabe; Fukumi Shimizu, both of Yokohama, all of Japan

[73] Assignee: Kabushiki Kaisha Toshiba, Kawasaki, Japan

[21] Appl. No.: 43,371

[22] Filed: Apr. 1, 1993

[30] Foreign Application Priority Data

Apr. 1, 1992 [JP] Japan ................... 4-079834

[51] Int. Cl.$^6$ .................. G01H 1/14; G01M 7/02
[52] U.S. Cl. .................. 364/508; 364/463; 73/658; 73/659; 73/660; 73/657
[58] Field of Search .................. 364/508, 463, 364/484, 576, 139; 310/90.5; 318/128; 73/658–660, 460, 651, 458

[56] References Cited

U.S. PATENT DOCUMENTS

| | | | |
|---|---|---|---|
| 3,866,109 | 2/1975 | Reed et al. | 364/139 |
| 4,014,392 | 3/1977 | Ross | 173/118 |
| 4,060,716 | 11/1977 | Pekrul et al. | 364/576 |
| 4,344,328 | 8/1982 | Hawkins | 364/484 |
| 4,485,678 | 12/1984 | Fanuele | 364/508 |
| 4,686,404 | 8/1987 | Nakazeki et al. | 310/90.5 |
| 5,126,641 | 6/1992 | Putman et al. | 318/128 |
| 5,172,325 | 12/1992 | Heidari | 364/463 |
| 5,197,010 | 3/1993 | Anderson | 364/463 |
| 5,214,585 | 5/1993 | Ehrich | 364/463 |

OTHER PUBLICATIONS

Walter, T. J. et al, "Diagnosing Vibration Problems in Vertically Mounted Pumps", *Transactions of the ASME*, vol. 110, pp. 172–177, New York, Apr. 1988.

Verhoeven, J. J. et al, "Development and Operating Experience of a 5000 KW Test Boilerfeed Pump on Active Magnetic Bearings", *IMechE*, C439/004, pp. 91–103, United Kingdom, 1992.

*Primary Examiner*—Emanuel T. Voeltz
*Assistant Examiner*—Kamini S. Shah
*Attorney, Agent, or Firm*—Foley & Lardner

[57] ABSTRACT

To improve the coupling adjustment workability and precision of a rotor, irrespective of change in bearing characteristics due to an increase of rotational speed, the apparatus detects angular frequencies ($\omega$) and reference mark positions ($\theta$) of the rotor; detects vibration displacements ($r$) of the rotor; analyzes vibration vector components ($\omega$), ($r$) and ($\theta$) of rotation synchronizing vibrations; extracts a specific angular frequency ($\omega_1$) at which a higher harmonic vibration frequency ($\omega_R$) matches a natural frequency of the rotor, and various rotation synchronizing vibration vector components at ($\omega_1$), at ($\omega_R$) and ($\omega_2$ to $\omega_i$), respectively; estimates static vibration vector components ($r_0$, $\theta_0$) at zero angular frequency ($\omega_0$) on the basis of rotation synchronizing vibration vector components ($r_T$, $\theta_T$) at ($\omega_1$ to $\omega_i$) and in accordance with a polynomial; obtains dynamic vibration vector components ($r_n$, $\theta_n$) by subtracting the static vibration vector components ($r_0$, $\theta_0$) from the rotation synchronizing vibration vector components ($r_{Tn}$, $\theta_{Tn}$), respectively; identifies a vibration response function; and estimates an eccentric direction ($\theta$) and an eccentric quantity ($\delta$) to be adjusted on the basis of ($r_n$, $\theta_n$) at ($\omega_R$) and at ($\omega_1$ to $\omega_i$) and in accordance with the identified vibration response function. Further, the real time vibration status of the rotor and the estimated eccentric direction and quantity are all displayed.

7 Claims, 9 Drawing Sheets

APPARATUS FOR ADJUSTING ROTOR

BACKGROUND OF THE INVENTION

1. Field of the Invention

The present invention relates to an apparatus for adjusting a rotor, and more specifically to an apparatus for adjusting an eccentricity at a coupling portion of the rotor, which can be applied to a rotating machine whose bearing characteristics vary markedly with increasing rotational speed.

2. Description of the Prior Art

In the case of an ordinary rotating machine such that a first rotor (e.g., a motor) and a second rotor (e.g., a pump shaft) are connected to each other via a coupling joint, it is necessary to estimate an eccentric quantity (decentering quantity) and an eccentric direction at the coupling joint in order to reduce an unbalanced force; that is, to adjust an eccentricity at the coupling joint of the rotor. The method of obtaining the above-mentioned eccentric quantity and direction can be classified roughly into a direct reading technique and a vibration vector analyzing technique.

In the former case, an inspector measures the shaft deflection quantity with the use of a gage as the measurement instrument under the condition that the rotor is being rotated at a low speed or rotated manually, and further calculates the adjustment quantity on the basis of the measured results.

Figure 1A:
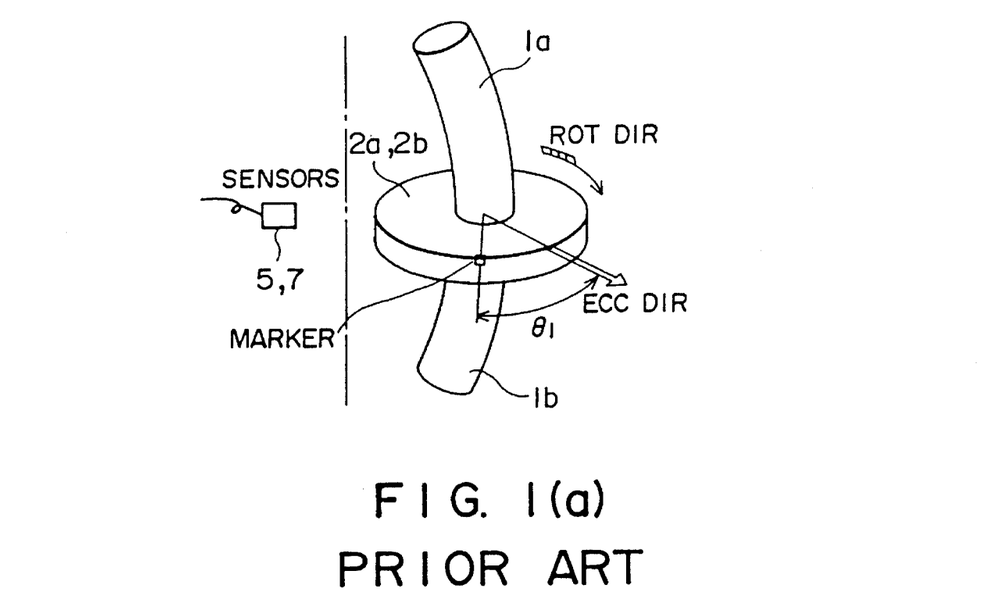
FIG. 1(a) is a perspective illustration for assistance in explaining a prior art coupling joint adjusting method.
Figure 1B:
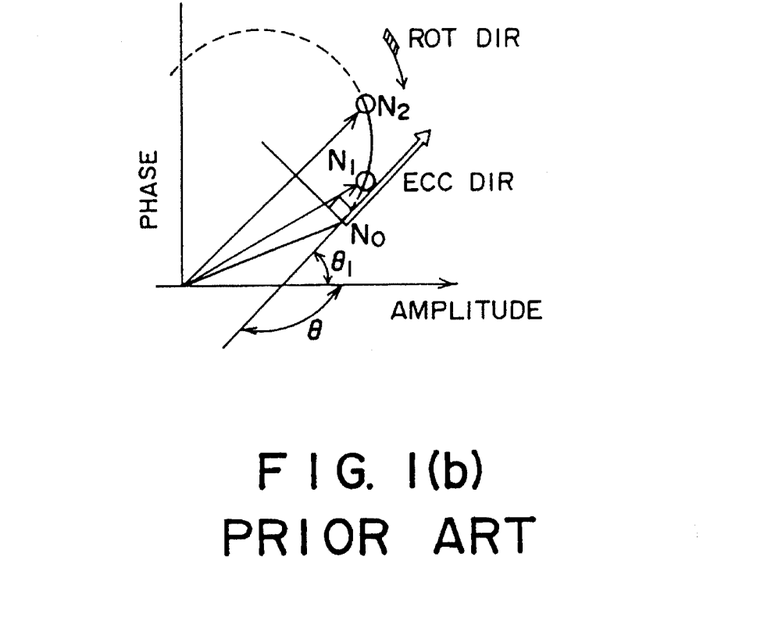
FIG. 1(b) is a graphical representation showing the relationship between the phase and the amplitude of the adjusting method shown in FIG. 1(a)

On the other hand, in the latter case, a non-contact displacement sensor is used as the measurement instrument to extract the vibration vector components synchronizing with the rotational speed of the rotor, and a vibration vector at a zero rotational speed ($N_0$) is obtained by approximating two vibration vectors ($N_1$, $N_2$), each composed of an amplitude and a phase as shown in FIG. 1(b), so as to be arranged on a mode circle of one degree of freedom under the assumption that the bearing characteristics are kept constant. The direction (the thick arrow direction in FIG. 1(b)) of an unbalance force (i.e., the eccentric direction) of the coupling joint of the rotor can be obtained on the basis of the direction of a tangent line described on the mode circle at this rotational speed $N_0$. The eccentric direction to be adjusted is opposite to this thick arrow direction shown in FIG. 1(b). Further, the eccentric quantity can be estimated on the basis of a coefficient representative of the relationship between the amplitude and the eccentric quantity.

Further, in FIG. 1(a), two rotating shafts $1a$ and $1b$ are connected by two coupling joints $2a$ and $2b$, and a displacement sensor 5 and a pulse sensor 7 (e.g., non-contact displacement meter) for detecting the rotational speed and a reference angular (marker) position of the rotating coupling joints are disposed a distance away from the coupling joints. Further, FIG. 1(b) indicates the relationship between the phase and the amplitude of vibration vectors $N_1$ and $N_2$ of the rotor shown in FIG. 1(a), in which $\theta_1$ denotes an angle between a marker (see FIG. 1(a)) and the eccentric direction.

In the above-mentioned adjusting methods, however, when the bearing characteristics vary markedly with increasing rotational speed as with the case of a recirculating pump, the resonance frequency of the rotor also varies according to the rotational speed of the rotor as shown in FIG. 1(b). In addition, the vibration amplitude is subjected to the influences of dynamic vibration vector components dependent upon the rotational speed (e.g., the non-uniformity of the surface shape of a rotor) and of static vibration vector components not dependent upon the rotational speed. Therefore, in the prior art adjusting means established on the assumption that the bearing characteristics are constant, there exists a problem in that a precise estimation of the eccentric quantity and direction cannot be obtained and additionally a lot of time is inevitably required to adjust the eccentricity or decentering of the rotor.

Further, since dial gages have been so far used for the measurement instruments (as the displacement sensor 5 and the pulse sensor 7), vibration information can be obtained only when the rotor is rotating at a relatively low speed. In other words, it has been so far difficult to adjust the eccentricity of the rotor below a predetermined reference value, by predicting a vibration status at the rated rotational speed on the basis of the vibration conditions obtained at a plurality of different rotational speeds.

SUMMARY OF THE INVENTION

With these problems in mind, therefore, it is the object of the present invention to provide an apparatus for adjusting a coupling portion of a rotor, which can be applied to various rotating machines whose bearing characteristics vary markedly according to the number of revolutions and which can detect the vibration status of the rotor immediately at high precision even at a field location or in-plant location.

To achieve the above-mentioned object, the present invention provides an apparatus for adjusting a rotor, comprising: a plurality of displacement sensors for detecting shaft vibration of a rotor at different positions; a rotation pulse sensor for detecting rotational speed of the rotor and a reference position in a circumferential direction of the rotor; a preprocessor responsive to the sensor signals, for cutting off frequency components beyond a predetermined frequency of the sensor signals, and further A/D converting the cut-off analog sensor signals into digital sensor signals; a frequency analyzer responsive to the A/D converted vibration signals at different measurement positions and the rotational speed, for analyzing spectra of the A/D converted vibration signals at different positions and rotational pulse signal; a degree analyzer responsive to the analyzed spectra of the vibration signals at different measurement positions and the rotational pulse signal, for extracting vibration vectors indicative of amplitudes and phase delay from the rotational pulse signal of vibration signals at the rotational speed and a frequency an integer number of times higher than the rotational speed of the rotor; an adjustment quantity calculator responsive to the vibration vectors of rotational speed components obtained by the displacement and rotation pulse sensor signals at different rotational speeds of the rotor, for extracting only dynamic components due to unbalance of the rotor, identifying a vibration response function of the rotor on the basis of the fact that a frequency component an integer number of times higher than the rotational speed of the rotor matches a natural vibration frequency of the rotor, and estimating an unbalanced direction of the rotor and an eccentric quantity to be adjusted at a coupling portion of the rotor; a real time monitor for estimating tendency of vibration increase and decrease and indicating the obtained unbalance direction and eccentric quantity to be adjusted of the rotor; and a vibration status monitor for discriminating whether the vibration vector obtained by the degree analyzer lies within a predetermined decision range or not.

In the first embodiment of the present invention, an apparatus for adjusting an eccentricity of a rotor, comprises: means for detecting angular frequencies ($\omega$) and reference mark positions ($\theta$) of the rotor at different rotational speeds of the rotor; means for detecting vibration displacements (r) of the rotor at different rotational speeds of the rotor; means for analyzing vibration vector components of frequency ($\omega$), amplitude (r) and phase ($\theta$) of rotation synchronizing vibrations of the rotor on the basis of the detected angular frequencies, vibration displacements and reference mark positions at different rotational speeds of the rotor; means for extracting a specific angular frequency ($\omega_1$) at which a higher harmonic vibration frequency ($\omega_R$) included in the detected vibration displacements matches a natural frequency of the rotor, and various rotation synchronizing vibration vector components at the specific angular frequency ($\omega_1$), at the higher harmonic vibration frequency ($\omega_R$) and at other several different angular frequencies ($\omega_2$ to $\omega_i$), respectively; means for estimating static vibration vector components ($r_0$, $\theta_0$) at zero angular frequency ($\omega_0$) on the basis of rotation synchronizing vibration vector components ($r_T$, $\theta_T$) at different angular frequencies ($\omega_1$ to $\omega_i$) of the rotor and in accordance with a polynomial; means for obtaining dynamic vibration vector components ($r_n$, $\theta_n$) at the different angular frequencies by subtracting the obtained static vibration vector components ($r_0$, $\theta_0$) from the rotation synchronizing vibration vector components ($r_{Tn}$, $\theta_{Tn}$) at the different angular frequencies, respectively; means for identifying a vibration response function for both the rotation synchronizing vibration vector components and the higher harmonic vibration vector components; and means for estimating an eccentric direction ($\theta$) and an eccentric quantity ($\delta$) to be adjusted on the basis of the obtained dynamic vibration vector components ($r_n$, $\theta_n$) at the higher harmonic frequency ($\omega_R$) and at any given angular frequencies ($\omega_1$ to $\omega_i$) and in accordance with the identified vibration response function.

In the first embodiment, the resonance angular frequency $\omega_R$ is obtained on the basis of the fact that the higher harmonic vibration frequency $\omega_R$ included in the detected vibration displacements matches the natural frequency of the rotor. The static vibration vector components at the zero angular frequency are estimated on the basis of a plurality of the rotation synchronizing vibration vectors and in accordance with a polynomial calculation. The dynamic vibration vector components are obtained by subtracting the estimated static vibration vector components from the rotation synchronizing vibration vector components. Further, the eccentric direction and the eccentric quantity to be adjusted can be estimated on the basis of the obtained dynamic vibration vector components at the higher harmonic frequency and any given angular frequencies and in accordance with the identified vibration response function.

According to the first embodiment of the present invention, the coupling adjustment is calculated in accordance with a coupling adjusting calculation algorithm applicable to a rotating machine whose bearing characteristics vary markedly according to the number of revolutions of the rotor. Therefore, it is possible to predict the vibration conditions at the rated speed and the vibration vector at the zero rotational speed; that is, the static component (vibration components not directly dependent upon the rotational speed due to the non-uniform surface shape of the rotor), and further to realize a precise adjusting technique on the basis of the predicted values. In addition, in the apparatus according to the present invention, it is possible to achieve the coupling adjusting work of a rotor at a short time even at a construction field.

In the second embodiment of the present invention, the apparatus for adjusting an eccentricity of a rotor comprises: means for detecting angular frequencies and X- and Y-direction displacements of a shaft of the rotor at different rotational speeds of the rotor; means for obtaining a natural vibration frequency fR of the rotor at a rotating speed R thereof on the basis of the fact that a higher harmonic vibration frequency included in the detected shaft displacement signals matches a natural vibration frequency of the rotor at a rotational speed R; means for calculating a shift quantity LR of the rotor at a rotating center on the basis of an averaged value of the detected X- and Y-direction shaft displacements; means for obtaining a bearing spring stiffness KR of the rotor at the rotational speed R on the basis of the obtained natural vibration frequency fR of the rotor and in accordance with relationship data between the bearing spring stiffness K and the natural vibration frequency f; means for obtaining an eccentricity $\epsilon$R of the shaft bearing portion at the rotational speed R on the basis of the obtained spring stiffness KR at the shaft bearing portion and in accordance with relationship data between the bearing eccentricity $\epsilon$ and the bearing spring stiffness K; means for converting the obtained bearing eccentricity $\epsilon$R of the bearing portion into an eccentric quantity XR at the bearing portion and further obtaining an eccentric quantity XR' at the shaft displacement measuring position on the basis of the converted eccentric quantity XR at the bearing portion and in accordance with relationship data between the eccentric quantity X at the bearing portion and eccentric quantity X' at the shaft displacement measurement position; and means for assuming an eccentric direction $\theta$R of the eccentric quantity XR' at the shaft displacement measurement position, and correcting the eccentric quantity XR' of the rotor at the rotating center in the shaft displacement measurement position with reference to the already calculated actual shift quantity LR of the rotor at the rotating center.

In this second embodiment, first the natural vibration frequency of the rotor is obtained on the basis of the fact that a higher harmonic vibration frequency included in the detected shaft displacement signals matches the natural vibration frequency of the rotor. The actual shift quantity is detected by the two directional shaft displacement sensors. The bearing spring stiffness is calculated on the basis of the obtained natural vibration frequency and the relationship data between both. The eccentricity of the bearing portion is calculated on the basis of the bearing spring stiffness and the relationship data between both. The calculated bearing eccentricity is converted into the bearing eccentric quantity, and further converted into the same eccentric quantity at the shaft displacement measuring position on the basis of relationship data between both. The eccentric direction of the eccentric quantity at the measurement position is assumed, and further the eccentric quantity (a rate) is corrected to the actual eccentric quantity with reference to the actually calculated shift quantity.

Further, the apparatus of this second embodiment further comprises: means for obtaining a total load FTR to the bearing at the rotational speed R on the basis of the obtained bearing eccentric quantity XR and in accordance with relationship data between the bearing eccentric quantity X and the bearing load F; means for assuming an initial eccentric quantity $\epsilon$0 of the rotor and obtaining a load FaR due to the initial eccentric quantity $\epsilon$0 in accordance with the relationship data between the bearing eccentric quantity X and the bearing load F; means for obtaining a fluid load FfR of the rotor by subtracting the initial load FaR from the total load FTR; and means for minimizing the fluid load FfR at a rated rotational speed R by correcting the initial eccentric quantity $\epsilon$0 when necessary.

Accordingly, it is also possible to calculate the fluid load applied to the rotor and thereby to minimize the fluid load at the rated rotational speed of the rotor.

DETAILED DESCRIPTION OF THE PREFERRED EMBODIMENTS

A first embodiment of the apparatus for adjusting an eccentricity of a coupling portion of a rotor according to the present invention will be described hereinbelow with reference to the attached drawings.

Figure 2:
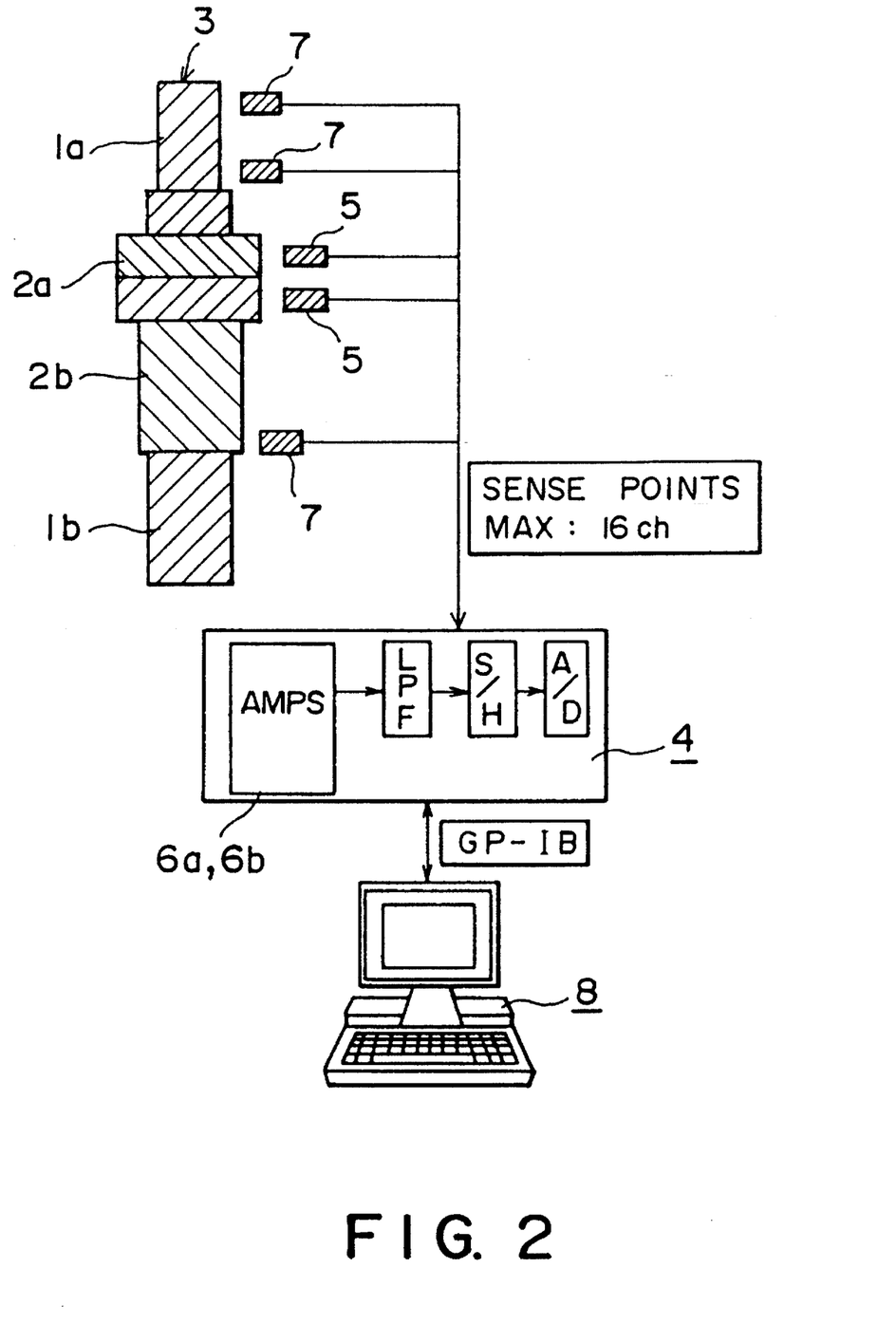
FIG. 2 is a schematic block diagram showing a first embodiment of the apparatus for adjusting a coupling portion of a rotor according to the present invention.

FIG. 2 is a view showing the composing elements of the adjusting apparatus of the embodiment. In FIG. 2, a rotor 3 is constructed by coupling two rotating shafts 1a and 1b via two coupling joints 2a and 2b. The apparatus comprises a plurality of displacement sensors 5, a plurality of pulse sensors 7, a preprocessing unit 4, and an execution unit (a microcomputer) 8. The displacement sensors 5 measure the shaft displacement value (vibration amplitude). The pulse sensors 7 detect the number of revolutions (rotational speed or vibration frequency) and the reference (mark) positions (vibration phase) in the circumferential direction of the rotor 3. The preprocessing section 4 executes the shaft vibration measurement of the rotor 3. The preprocessing section 4 includes a number of amplifiers 6a and 6b for amplifying the signals detected by the displacement sensors 5 and the pulse sensors 7, low-pass filters LPF for passing the amplified sensor signals therethrough to cut off the frequency components higher than a predetermined frequency, signal shaping circuits S/H for shaping the waveforms of these filtered signals, and analog-digital convertors A/D for converting the waveform shaped analog signals to digital signals suitable for the processing by the microcomputer 8. The vibration information signals thus preprocessed are supplied to the microcomputer 8. The microcomputer 8 converts the supplied digital signals into physical quantities (frequency, amplitude, and phase) to form vibration vectors, analyzes the vibration vector components thereof into various degrees, and calculates the coupling adjustment quantity and direction in accordance with a coupling adjustment calculating algorithm as described below.

Figure 3:
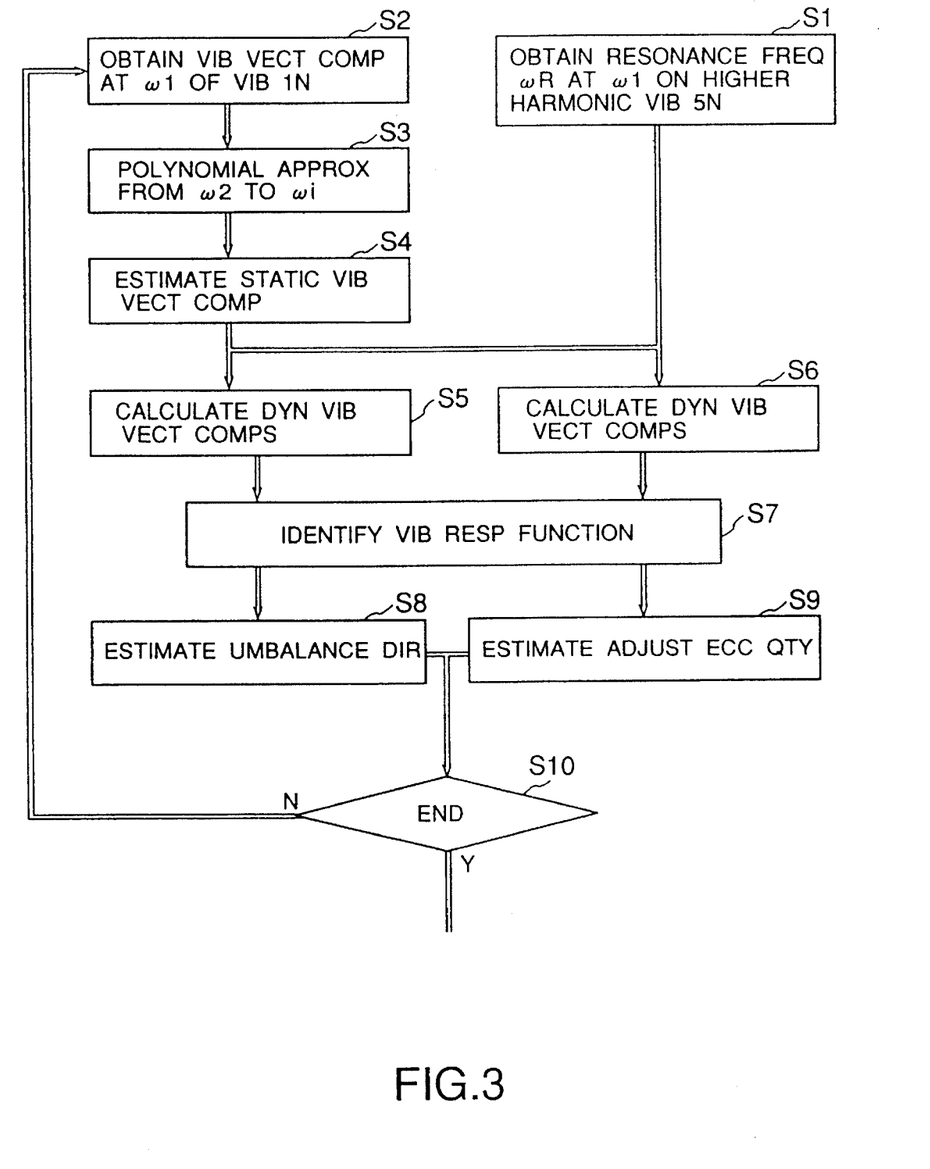
FIG. 3 is an algorithm chart for assistance in explaining the coupling adjustment calculation adopted for the coupling adjusting apparatus shown in FIG. 2.

FIG. 3 shows this coupling adjustment calculating algorithm. Control first obtains a resonance angular frequency $\omega_R$ at an angular frequency $\omega_1$ ($\omega$(rad/sec)=$2\pi f$) on the basis of the fact that an angular frequency $\omega_R$ an integer number of times higher than the angular frequency $\omega_1$ of the rotor matches a natural frequency of the rotor. That is, the resonance angular frequency $\omega_R$ can be obtained on the basis of the angular frequency $\omega_1$, the amplitude $r_{T1}$ and the phase $\theta_{T1}$ by utilizing the resonance phenomenon of the angular frequency $\omega_1$ of the rotation synchronizing vibration 1N with the higher harmonic vibration 5N (e.g., fifth degree higher harmonics) (the frequency component can be confirmed by dividing the rotating blades into a predetermined number of blades under illumination with a stroboscope in the case of a pump, for instance) (in step S1). At the same time, control obtains the vibration vector components ($\omega_1$, $r_{T1}$, and $\theta_{T1}$) of the vibration 1N synchronized with the rotation of the rotor (in step S2).

Successively, the vibration vector components at the rotation synchronizing vibrations are obtained at several points by changing the angular frequency from $\omega_2$ to $\omega_i$. On the basis of the obtained results at the angular frequencies ($\omega_1$ to $\omega_i$), the static vibration vector components ($r_0$=f(0), $\theta_0$=g(0)) at the zero angular frequency ($\omega_0$) can be estimated in accordance with a polynomial ($r_T$=f($\omega$), $\theta_T$=g($\omega$)) (in steps S3 and S4). Further, the dynamic vibration vector components ($r_n$, $\theta_n$) dependent upon the rotational speeds can be obtained by subtracting the static vibration vector components ($r_0$, $\theta_0$) from the vibration vector components ($r_{Tn}$, $\theta_{Tn}$) at the rotation synchronizing vibrations at the respective rotational speeds already obtained (in step S5). On the other hand, the dynamic vector components at the higher harmonic resonance frequency component 5N at the resonance frequency $\omega_R$ are also obtained in the same way as above (in step S6). A vibration response function can be identified for all the dynamic vibration vector components obtained in steps S5 and S6 (in step S7).

Accordingly, the eccentric direction $\theta$ and quantity $\delta$ to be adjusted finally can be obtained on the basis of the resonant angular frequency $\omega_R$ and the dynamic vibration vector components $(r_1, \theta_1)$=$(r_{T1}, \theta_{T1})$−$(r_0, \theta_0)$ at this angular frequency $\omega_1$ and the dynamic vibration vector components ($r_n$, $\theta_n$) at any given rotational speeds ($\omega_1$ to $\omega_n$) in accordance with the following vibration response function:

$$r_n = \frac{\epsilon_n(\omega_n/\omega_{on})^2}{\sqrt{(1-(\omega_n/\omega_{on})^2)^2 + (2\zeta_n\omega/\omega_{on})^2}}$$

$$\theta_n = \tan^{-1}\frac{2\zeta_n\omega/\omega_{on}}{1-(\omega_n/\omega_{on})^2} + \theta_{on}$$

$$\theta = 180° - \frac{\Sigma \theta_{on}}{n}$$

$\delta = K \cdot r$  K: Sensitivity constant

Figure 4:
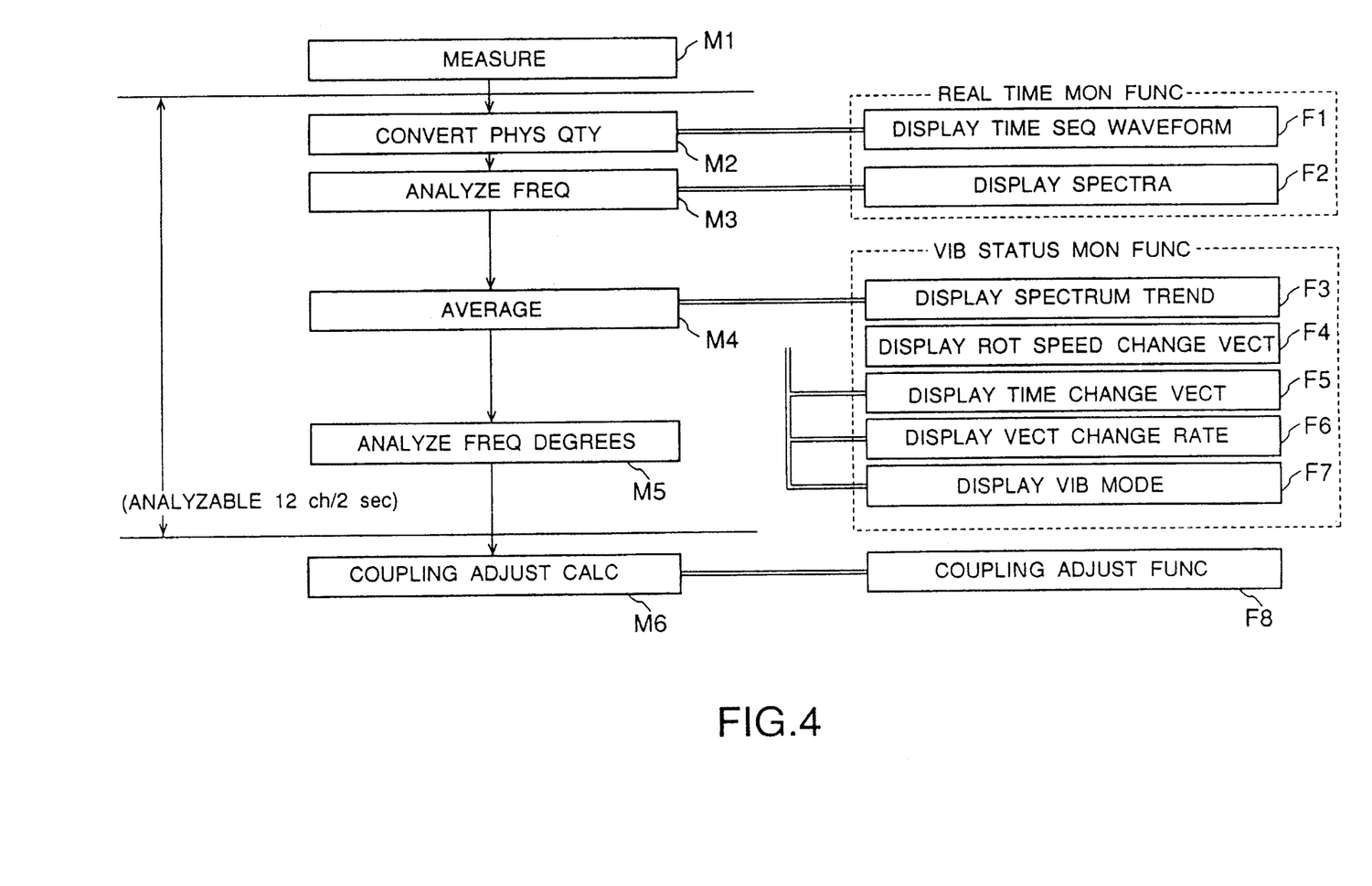
FIG. 4 is a function chart for assistance in explaining the functions executed by the execution section shown in FIG. 2.

The operation of the first embodiment will be described hereinbelow with reference to FIG. 4, in which the coupling adjusting functions of the execution section 8 are shown. The execution section 8 is provided with a real time monitoring function, and a vibration status monitoring function. Further, the real time monitoring function can be divided into a time sequential waveform monitoring function (F1) and a spectrum monitoring function (F2). The vibration monitoring function can be divided into a spectrum trend monitoring function (F3), a rotational speed change vector monitoring function (F4), a time-change vector monitoring function (F5), a vector change rate monitoring function (F6), and a vibration mode monitoring function (F7). In more detail, the vibration waveforms can be displayed with the passage of time, and the vibration spectra are also displayed. Further, the vibration spectrum trend is also indicated; the vibration vectors indicative of the change in the rotational speed are also shown; the various vectors are shown with the passage of time; the vector change rate is also shown; and the vibration modes can be displayed all on an appropriate display unit of the execution section 8.

Further, measurement control analyzes the measured results of 12 channels at intervals of 2 sec, for instance.

The measurement results (sensor signals) (M1) are first transformed into physical quantities, such as frequencies, amplitudes, phases, etc. (M2). The time sequential waveforms are displayed on the basis of these physical quantities. The transformed physical quantities are further analyzed into frequency vector components (M3). The frequency spectra can be obtained on the basis of the transformed frequencies. The transformed frequencies are averaged (M4). The spectrum trend is shown on the basis of the averaged frequencies. Further, the degrees (higher harmonics) of the averaged frequencies are analyzed (M5). On the basis of these analyzed results, the coupling adjustment values are calculated (M6).

In more detail, the execution unit 8 of the apparatus for adjusting an eccentricity of a rotor is provided with the following functions: for analyzing vibration vector components of frequency ($\omega$), amplitude ($r$) and phase ($\theta$) of rotation synchronizing vibrations of the rotor on the basis of the detected angular frequencies, vibration displacements and reference mark positions at different rotational speeds of the rotor; for extracting a specific angular frequency ($\omega_R$) at which a higher harmonic vibration frequency ($\omega_R$) included in the detected vibration displacements matches a natural frequency of the rotor, and various rotation synchronizing vibration vector components at the specific angular frequency ($\omega_1$), at the higher harmonic vibration frequency ($\omega_R$) and at other several different angular frequencies ($\omega_2$ to $\omega_i$) respectively; for estimating static vibration vector components ($r_0, \theta_0$) at zero angular frequency ($\omega_0$) on the basis of rotation synchronizing vibration vector components ($r_T, \theta_T$) at different angular frequencies ($\omega_1$ to $\omega_i$) of the rotor and in accordance with a polynomial; for obtaining dynamic vibration vector components ($r_n, \theta_n$) at the different angular frequencies by subtracting the obtained static vibration vector components ($r_0, \theta_0$) from the rotation synchronizing vibration vector components ($r_{Tn}, \theta_{Tn}$) at the different angular frequencies, respectively; for identifying a vibration response function for both the rotation synchronizing vibration vector components and the higher harmonic vibration vector components; and for estimating an eccentric direction ($\theta$) and an eccentric quantity ($\delta$) to be adjusted on the basis of the obtained dynamic vibration vector components ($r_n, \theta_n$) at the higher harmonic frequency ($\omega_R$) and at any given angular frequencies ($\omega_1$ to $\omega_i$) and in accordance with the identified vibration response function.

On the basis of the coupling adjusting operation, that is, the coupling adjustment calculation results, the current eccentric quantity and direction and the corrected eccentric quantity and direction are all displayed on the screen in motion picture mode.

As described above, in the apparatus according to the present invention, it is possible to provide a highly precise coupling adjusting effect for a rotor in accordance with the coupling adjustment calculating algorithm, while improving the adjustment reliability and the adjusting work efficiency.

A second embodiment of the present invention will be described hereinbelow with reference to the attached drawings.

Figure 5:
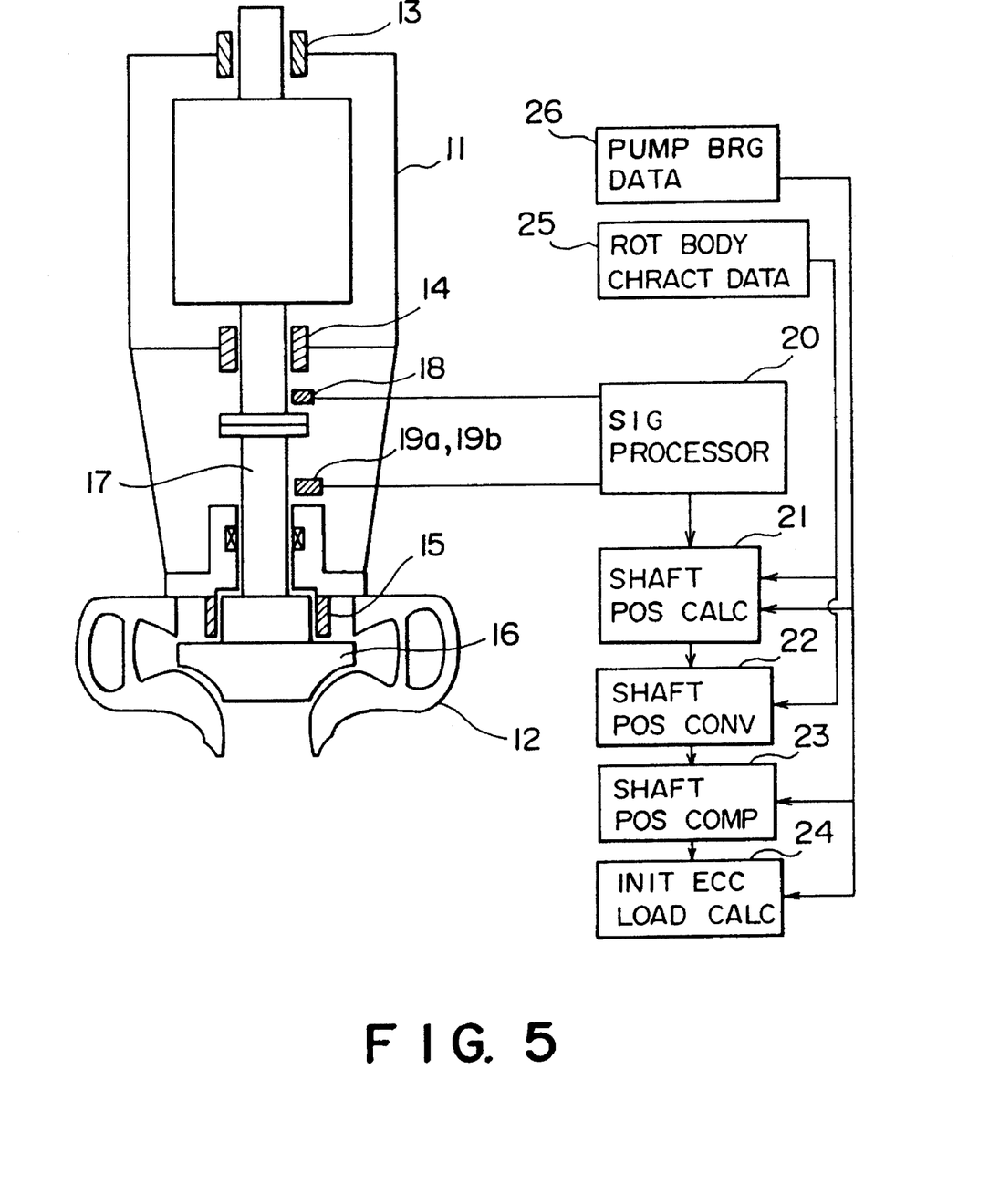
FIG. 5 is a diagrammatical view including a schematic block diagram showing a second embodiment of the present invention, in which a pump fluid force calculating apparatus is shown.

FIG. 5 is an apparatus construction and the block diagram of the present invention. In the drawing, a motor 11 drives a pump 12. The motor 11 is supported by an upper bearing 13 and a lower bearing 14. The driving force of the motor 11 is transmitted to a blade wheel 16 via a primary pump shaft 17 to pump up fluid. The primary pump shaft 17 and the blade wheel 16 are both supported by a pump bearing 15. Further, a rotation pulse meter 18 is disposed at the primary pump shaft 17 to detect the number of revolutions of the primary pump shaft 17 and the blade wheel 16. Two shaft displacement meters 19a and 19b are disposed at the primary pump shaft 17 on the upper side of the pump bearing 15 to measure the X- and Y-direction displacements of the primary pump shaft 17.

In addition, a control or calculation section comprises a signal processing section 20 for receiving signals detected by the rotation pulse meter 18 and the shaft displacement meters 19a and 19b, a shaft position calculating section 21 for receiving the natural vibration frequency from the signal processing section 20, a shaft position conversion section 22 for receiving the eccentricity at the shaft displacement measurement locations at the resonance frequency from the shaft position calculation section 21, a shaft position comparison section 23 for receiving an eccentric quantity at the shaft displacement measurement locations from the shaft position conversion section 22, an initial eccentricity calculation section 24 for receiving the eccentric quantity at the pump shaft bearing portion from the shaft position comparison section 23, a memory 25 for storing the dynamic vibration characteristics data of the rotor indicative of the relationship between the spring stiffness of the pump bearing and the natural vibration frequency of the rotor and the relationship between the eccentric quantity of the pump shaft bearing portion and the eccentric quantity at the shaft displacement measurement location, and a memory 26 for storing pump bearing data indicative of the relationship between the spring stiffness of the pump bearing and the eccentricity of the pump bearing and the relationship between the load of the pump bearing and the eccentric quantity of the pump bearing portion.

Figure 6:
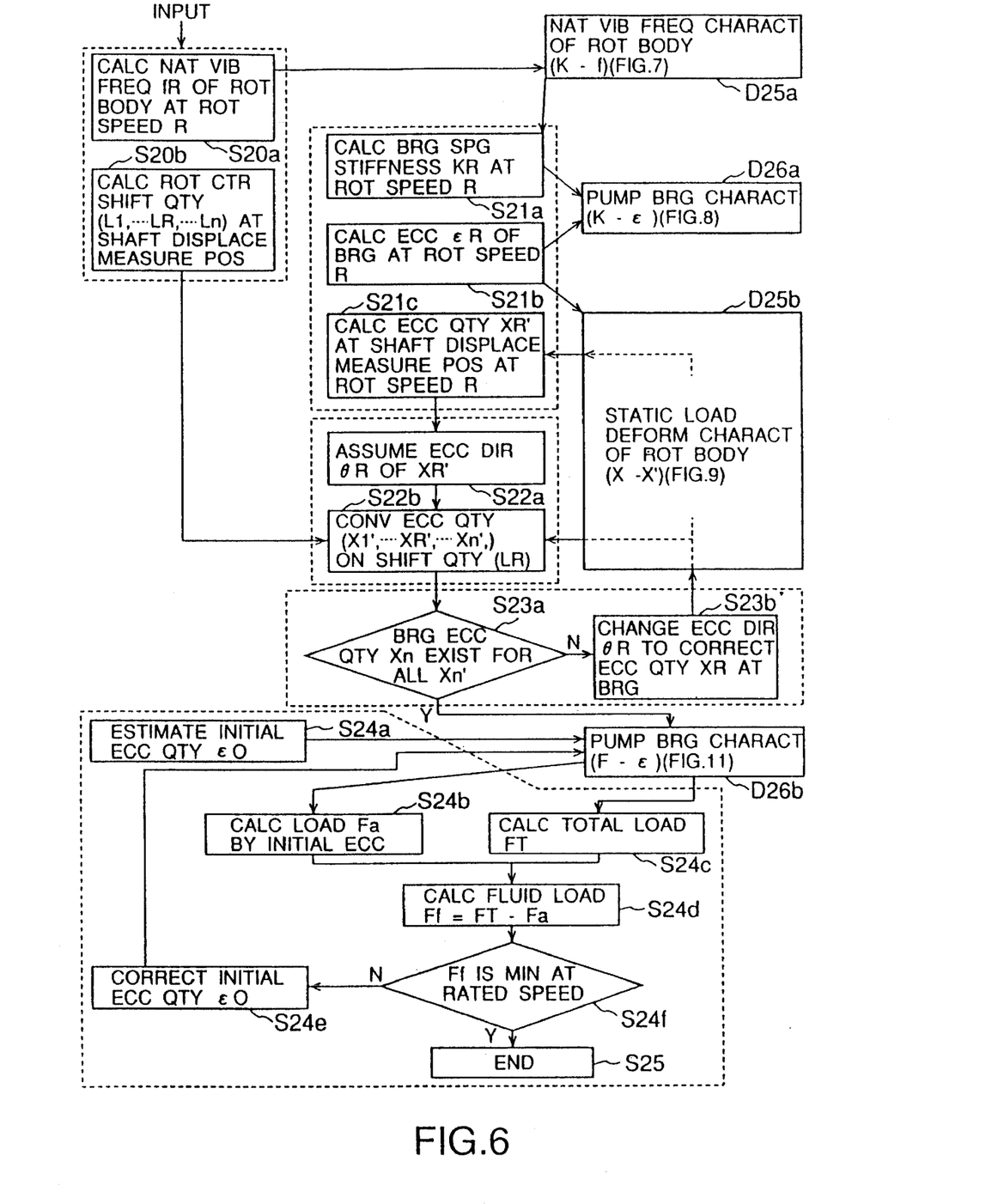
FIG. 6 is a flowchart for assistance in explaining the processing procedure of the apparatus shown in FIG. 5.
Figure 7:
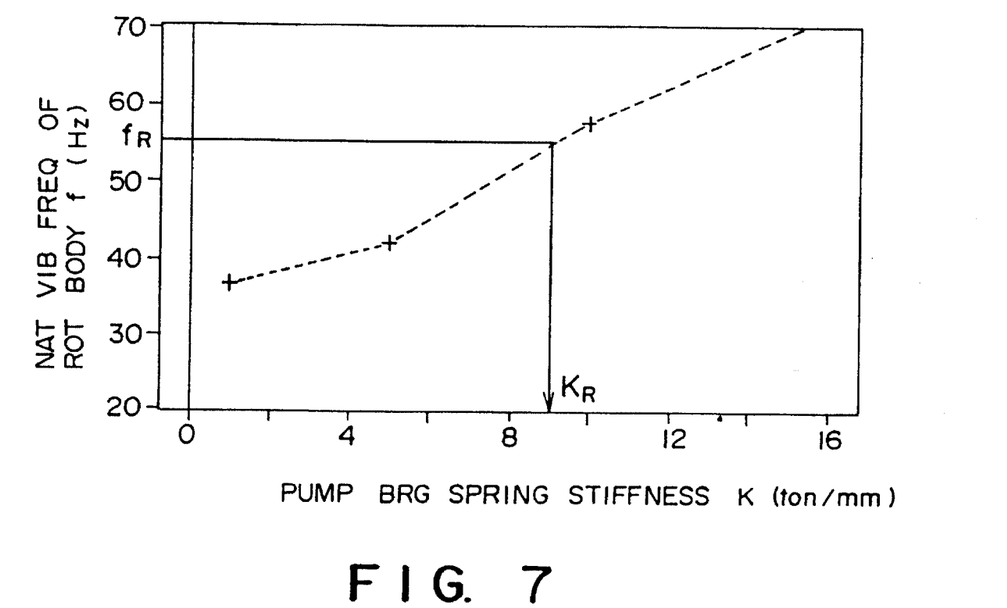
FIG. 7 is a graphical representation showing an example of the natural frequency characteristics between the spring stiffness of a bearing of a pump to be adjusted and the natural vibration frequency.
Figure 8:
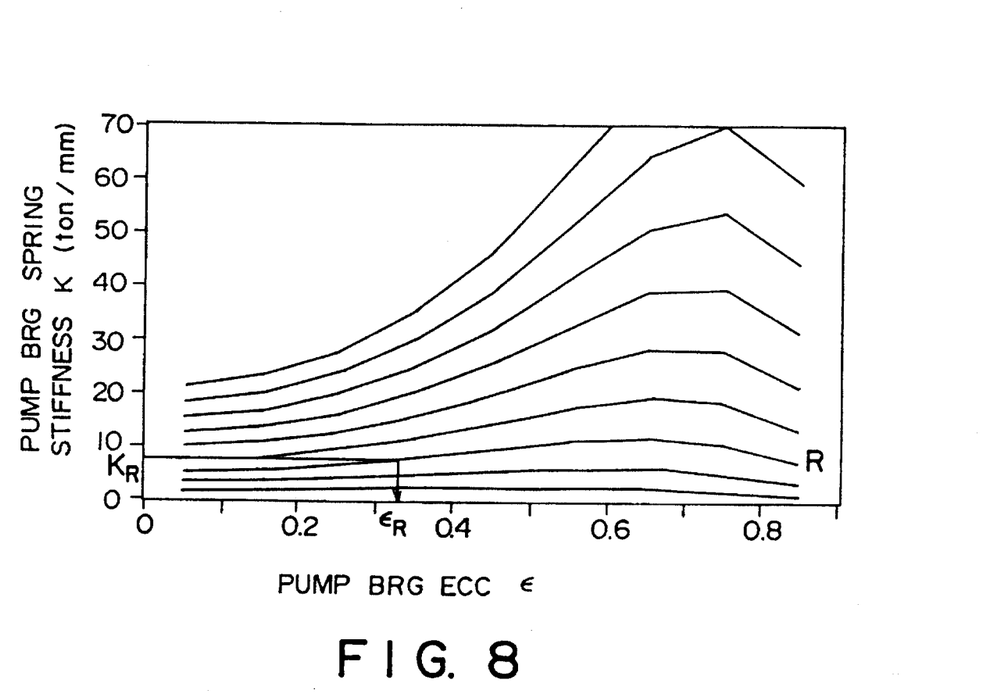
FIG. 8 is a graphical representation showing an example of the relationship between the eccentricity of the pump bearing and the pump spring stiffness.

The operation of the second embodiment will be described hereinbelow (see FIG. 6). The speed signals indicative of the rotational speed of the pump measured by the rotation pulse meter 18, and the displacement signals indicative of the shaft displacements measured by the shaft displacement meter 19a and 19b are both inputted to the signal processing section 20. The signal processing section 20 calculates the natural vibration frequency fR of the rotor at the rotational speed R on the basis of the fact that the higher harmonic vibration components of a rotational speed (included in the shaft displacement signals) match the natural frequency of the rotor at the rotational speed R (in step S20a). Further, the processing section 20 calculates the actual shift quantities (L1, ..., LR, ..., Ln) at the rotational center on the basis of the average shaft displacement values in the X- and Y-directions by changing the rotational speeds of the pump from 1 to n (in step S20b as shown in FIG. 6). The shaft position calculation section 21 calculates the pump bearing spring stiffness KR on the basis of the calculated natural vibration frequency fR of the rotor and in accordance with the rotor characteristic data between KR and fR (D25a) as shown in FIG. 7 by way of example (in step S21a). Further, the shaft position calculation section 21 calculates the eccentricity εR of the pump bearing portion on the basis of the calculated bearing spring stiffness KR and in accordance with the pump bearing characteristic data between ε and KR (D26a) as shown in FIG. 8 by way of example (in step S21b). Further, the shaft position calculation section 21 converts the calculated eccentricity ε at the pump bearing portion into the eccentric quantity XR at the pump bearing portion and further calculates the calculated eccentric quantity XR' at the shaft displacement measurement position on the basis of the rotor characteristic data between X and X' (D25b) as shown in FIG. 9 by way of example (in step S21c).

Figure 10:
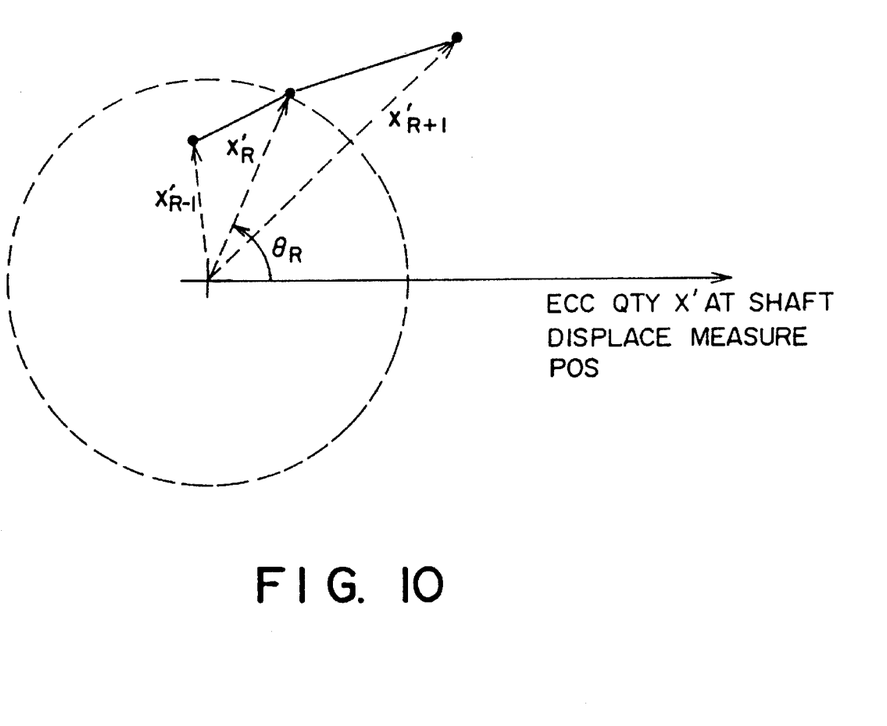
FIG. 10 is a graph for assistance in explaining how to obtain an eccentric quantity at the shaft displacement measuring position along an assumed eccentric direction.

The shaft position conversion section 22 assumes the eccentric direction θR of the eccentric quantity XR' at the shaft displacement measurement position obtained by the shaft position calculating section 11 (in step S22a), and further calculates the actual eccentric quantities (X1', ..., XR', ..., Xn') at the shaft displacement position at the rotational center with reference to the already obtained actual shift quantities (L1, ..., LR, ..., Ln) whenever the rotational speed changes (in step S22b) in accordance with the calculation method as shown in FIG. 10.

Figure 9:
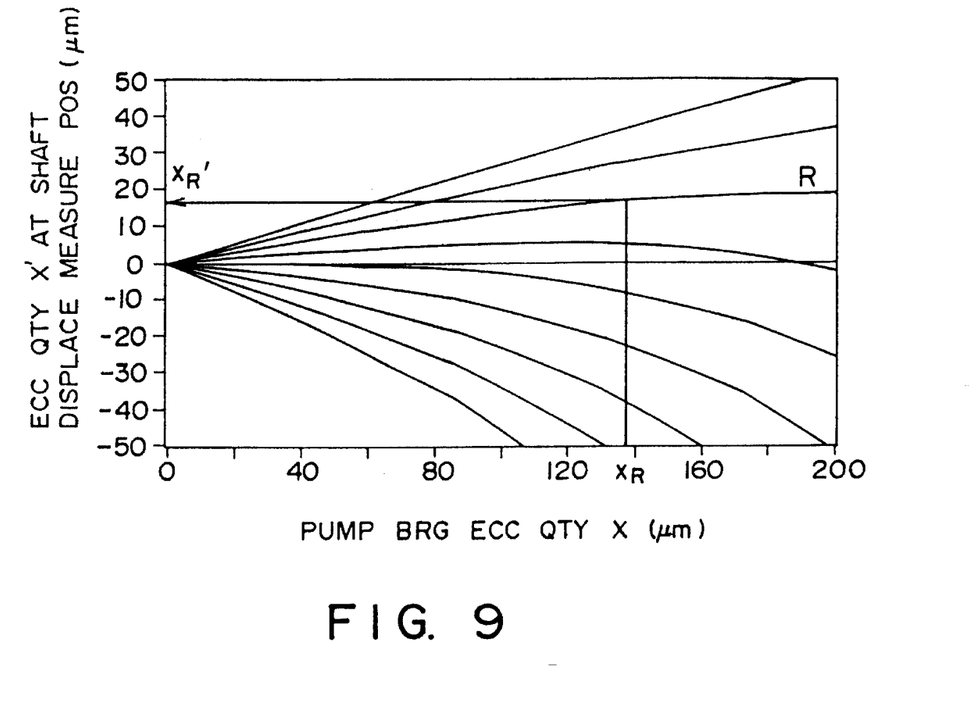
FIG. 9 is a graphical representation showing an example of the relationship between the eccentric quantity of the pump bearing of the pump to be adjusted and the eccentric quantity at the shaft displacement measuring position.

The shaft position comparison section 23 calculates the eccentric quantities (X1', ..., XR', ..., Xn') at the shaft displacement measurement position for all the eccentric quantities (X1, ..., XR, ..., Xn) at the rotational center in the bearing portion obtained by the shaft position conversion section 22 and in accordance with the rotor characteristic data (D25b) as shown in FIG. 9. In this case, if the eccentric quantities (X1', ... XR', ..., Xn') at the displacement measurement portion cannot be obtained (in step S23a), the eccentric direction θ or the eccentric quantities XR at the bearing portion are changed until the eccentric quantities XR' can be calculated (in steps S23a and S23b).

Figure 11:
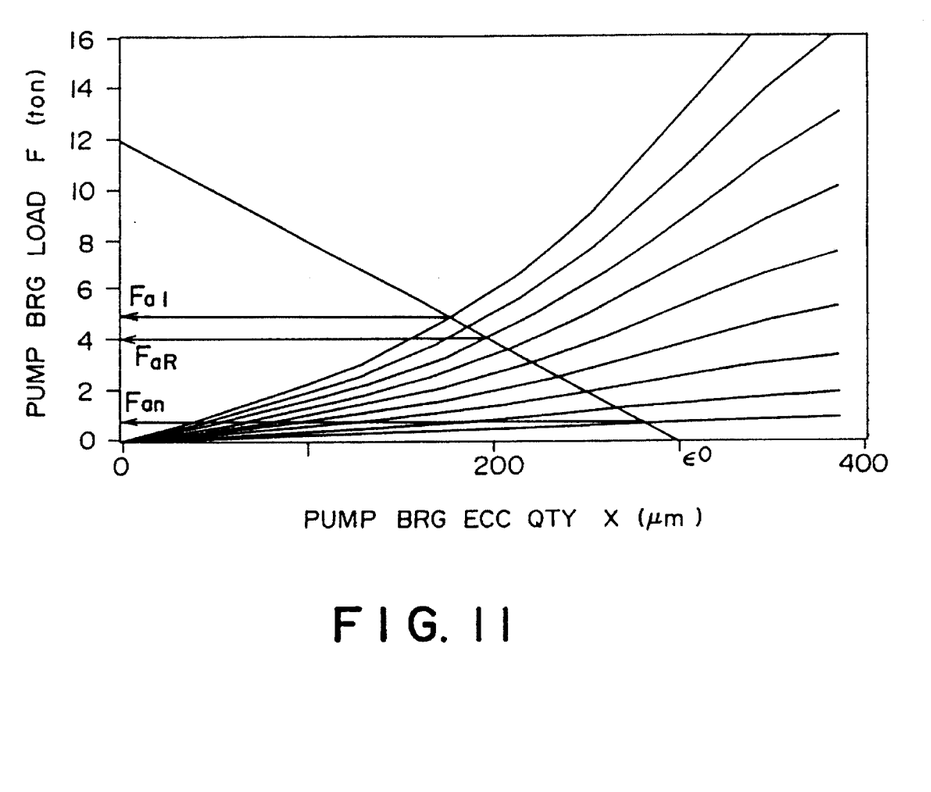
FIG. 11 is a graphical representation showing an example of the relationship between the eccentric quantity of the pump bearing portion or the initial eccentric quantity and the load applied onto the pump bearing.

The initial eccentricity calculation section 24 calculates total loads (FT1, ..., FTR, ..., FTn) upon the pump bearing on the basis of the eccentric quantities (X1, ..., XR, ..., Xn) at the pump bearing portion obtained by the shaft position comparison section 23 and in accordance with the pump bearing data between ε and F (D26b) as shown in FIG. 11 by way of example (in step S24c). Further, the initial eccentricity calculation section 24 assumes the eccentric quantity of the pump and the motor as ε0, and calculates the loads (Fa1, ..., FaR, ..., Fan) due to the initial eccentric quantity ε0 in accordance with the pump shaft bearing data D26b (in step S24b).

Further, the fluid loads (Ff1, ..., FfR, ..., Ffn) of the pump blades can be calculated as (FT1, ..., FTR, ..., FTn)−(Fa1, ..., FaR, ..., Fan) (in step S24d). If the obtained fluid loads (Ff1, ..., FaR, ..., Ffn) due to fluid force are not minimized at the rated rotational speed (in step S24f), the initial eccentric quantity is repeatedly corrected until the desired conditions can be satisfied in order to minimize the fluid load (in step 24f).

Therefore, the signal processing section 20 is provided with the functions: for detecting angular frequencies and X- and Y-direction displacements of a shaft of the rotor at different rotational speeds of the rotor; for obtaining a natural vibration frequency fR of the rotor at a rotating speed R thereof on the basis of fact that a higher harmonic vibration frequency included in the detected shaft displacement signals matches a natural vibration frequency of the rotor at a rotational speed R; and for calculating a shift quantity LR of the rotor at a rotating center on the basis of an averaged value of the detected X- and Y-direction shaft displacements.

Further, the shaft position calculation section 21, the shaft position conversion section 22, and the shaft position comparison section 23 are provided with the functions: for obtaining a bearing spring stiffness KR of the rotor at the rotational speed R on the basis of the obtained natural vibration frequency fR of the rotor and in accordance with relationship data between the bearing spring stiffness K and the natural vibration frequency f; for obtaining an eccentricity εR of the shaft bearing portion at the rotational speed R on the basis of the obtained spring stiffness KR at the shaft bearing portion and in accordance with relationship data between the bearing eccentricity εR and the bearing spring stiffness K; for converting the obtained bearing eccentricity εR of the bearing portion into an eccentric quantity XR at the bearing portion and further obtaining an eccentric quantity XR' at the shaft displacement measuring position on the basis of the converted eccentric quantity XR at the bearing portion and in accordance with relationship data between the eccentric quantity X at the bearing portion and eccentric quantity X' at the shaft displacement measurement position; and for assuming an eccentric direction θR of the eccentric quantity XR' at the shaft displacement measurement position, and correcting the eccentric quantity XR' of the rotor at the rotating center in the shaft displacement measurement position on the basis of the already calculated actual shift quantity LR of the rotor at the rotating center.

Further, in the above-mentioned sections 21 to 23, the shift quantities L1 to Ln are calculated by changing the rotational speed of the rotor; and all the eccentric quantities X1' to Xn' of the rotor at the rotating center in the shaft displacement measurement position at the different rotational speeds are repeatedly corrected by repeatedly assuming the eccentric directions θR of the eccentric quantities X1' to Xn' at the shaft displacement measurement position where necessary.

Further, the initial eccentric load calculation section 24 is provided with the functions: for obtaining a total load FTR to the bearing at the rotational speed R on the basis of the obtained bearing eccentric quantity XR and in accordance with relationship data between the bearing eccentric quantity X and the bearing load F; for assuming an initial eccentric quantity ε0 of the rotor and obtaining a load FaR due to the initial eccentric quantity ε0 in accordance with the relationship data between the bearing eccentric quantity X and the bearing load F; for obtaining a fluid load FfR of the rotor by subtracting the initial load FaR from the total load FTR; and for minimizing the fluid load FfR at a rated rotational speed R by correcting the initial eccentric quantity ε0 when necessary.

As described above, in this second embodiment, it is possible to continuously calculate the fluid load generated at the pump blades and the initial load generated by the initial eccentricity.

What is claimed is:

1. An apparatus for adjusting a rotor, comprising:

a plurality of displacement sensors for detecting shaft vibration of a rotor at a plurality of positions on the rotor, and for respectively outputting a plurality of vibration signals as a result thereof;

a rotation pulse sensor for detecting a rotational speed of the rotor and a reference position in a circumferential direction of the rotor, and for respectively outputting a rotational speed signal and a rotational pulse signal as a result thereof;

a preprocessor responsive to the signals output from the rotation pulse sensor and the plurality of displacement sensors, for filtering out frequency components beyond a predetermined frequency of the signals output from the rotation pulse sensor and the plurality of displacement sensors, and A/D converting the filtered signals into digital sensor signals;

a frequency analyzer responsive to the A/D converted vibration signals at respective plurality of positions and the rotational speed signal, for analyzing spectra of the A/D converted vibration signals at the respective plurality of positions and the rotational pulse signal;

a degree analyzer responsive to the analyzed spectra of the vibration signals at the respective plurality of positions and the rotational pulse signal, for extracting vibration vectors indicative of amplitudes and phase delay from the rotational pulse signal of the vibration signals at the rotational speed and at a frequency which is an integer number of times higher than the rotational speed of the rotor;

an adjustment quantity calculator for computing the vibration vector when the rotor is stopped as a static component by extrapolation from the vibration vectors of rotational speed components obtained by vibration displacement and rotational pulse signals at different rotational speeds of the rotor, for extracting dynamic components due to unbalance of the rotor by subtracting the static component from the vibration vectors, for estimating a natural vibration frequency of the rotor on the basis of a vibration component which is an integer number of times higher than the rotational speed of the rotor and that matches the natural vibration frequency of the rotor, for identifying a vibration response function of the rotor from the dynamic components and the natural vibration frequency of the rotor, from which a residual unbalance quantity of the rotor is computed, and for estimating an amount and a direction of eccentricity to be adjusted at a coupling portion of the rotor so as to adjust the residual unbalance quantity at the coupling portion of the rotor;

a real time monitor for estimating a tendency of vibration increase and decrease and indicating the obtained unbalance direction and eccentric quantity of the rotor to be adjusted; and a vibration status monitor for discriminating whether or not the vibration vector obtained by the degree analyzer lies within a predetermined decision range.

2. The apparatus for adjusting a rotor of claim 1, which further comprises:

a signal processor responsive to the A/D converted vibration signals at the respective plurality of positions, for calculating a natural vibration frequency at a rotational speed and shift quantities at rotational center in shaft displacement measurement positions by changing rotational speed;

a shaft position calculator for calculating eccentricities at the shaft displacement measurement positions at resonance in accordance with natural vibration frequency characteristics indicative of relationships between pump bearing spring stiffness of a pump to be diagnosed and the natural vibration frequency, relationships between pump bearing eccentricity and the pump bearing spring stiffness, and an eccentric quantity relationship between the pump bearing eccentric quantity and the eccentric quantities at the shaft displacement measurement positions;

a shaft position convertor for calculating eccentric quantities at the shaft displacement measurement positions on the basis of the eccentricities at the shaft displacement measurement positions at the resonance, the rotational center shift quantities at the shaft displacement measurement positions, and an assumed eccentric direction;

a shaft position comparator for calculating the eccentric quantities of the pump shaft bearing portions on the basis of the eccentric quantity at the shaft displacement measurement positions and in accordance with relationships between the eccentric quantities at the shaft displacement measurement positions and the eccentric quantities at the pump bearing portions, the eccentric quantities at the pump bearing portions being repeatedly calculated by correcting the eccentric directions until all the eccentric quantities at the pump bearing portions can be calculated; and an initial eccentric load calculator for calculating a total pump shaft bearing load and a load caused by the initial eccentric quantity on the basis of the calculated pump bearing eccentric quantities and the estimated initial eccentric quantities and direction at a motor bearing center relative to the pump bearing center in accordance with relationships between pump bearing eccentricity and pump bearing load, calculating a fluid load applied to pump blades, and correcting the initial eccentric quantity until a minimum fluid load can be specified at a rated rotating speed.

3. An apparatus for adjusting an eccentricity of a rotor, comprising:

means for detecting angular frequencies ($\omega$) and reference mark positions ($\theta$) of the rotor at different rotational speeds of the rotor;

means for detecting vibration displacements (r) of the rotor at different rotational speeds of the rotor;

means for analyzing vibration vector components of frequency ($\omega$), amplitude (r) and phase ($\theta$) of rotation synchronizing vibrations of the rotor on the basis of the detected angular frequencies, vibration displacements and reference mark positions at different rotational speeds of the rotor;

means for extracting a specific angular frequency ($\omega_1$) at which a higher harmonic vibration frequency ($\omega_R$) included in the detected vibration displacements matches a natural frequency of the rotor, and various rotation synchronizing vibration vector components at the specific angular frequency ($\omega_1$), at the higher harmonic vibration frequency ($\omega_R$) and at other several different angular frequencies ($\omega_2$ to $\omega_i$), respectively;

means for estimating static vibration vector components ($r_0$, $\theta_0$) at zero angular frequency ($\theta_0$) on the basis of rotation synchronizing vibration vector components ($r_T$, $\theta_T$) at different angular frequencies ($\omega_1$ to $\omega_i$) of the rotor and in accordance with a polynomial;

means for obtaining dynamic vibration vector components $(r_n, \theta_n)$ at the different angular frequencies by subtracting the obtained static vibration vector components $(r_0, \theta_0)$ from the rotation synchronizing vibration vector components $(r_{Tn}, \theta_{Tn})$ at the different angular frequencies, respectively;

means for identifying a vibration response function for both the rotation synchronizing vibration vector components and the higher harmonic vibration vector components; and means for estimating an eccentric direction ($\theta$) and an eccentric quantity ($\delta$) to be adjusted on the basis of the obtained dynamic vibration vector components $(r_n, \theta_n)$ at the higher harmonic frequency $(\omega_R)$ and at any given angular frequencies $(\omega_1$ to $\omega_i)$ and in accordance with the identified vibration response function.

4. The apparatus for adjusting an eccentricity of a rotor of claim 3, which further comprises: means for monitoring real time vibration status of the rotor and for displaying the estimated eccentric direction and quantity.

5. An apparatus for adjusting an eccentricity of a rotor, which comprises:

means for detecting angular frequencies and X- and Y-direction displacements of a shaft of the rotor at different rotational speeds of the rotor;

means for obtaining a natural vibration frequency fR of the rotor at a rotating speed R thereof on the basis of a higher harmonic vibration frequency included in the detected shaft displacement signals that matches a natural vibration frequency of the rotor at a rotational speed R;

means for calculating a shift quantity LR of the rotor at a rotating center on the basis of an averaged value of the detected X- and Y-direction shaft displacements;

means for obtaining a bearing spring stiffness KR of the rotor at the rotational speed R on the basis of the obtained natural vibration frequency fR of the rotor and in accordance with relationship data between the bearing spring stiffness K and the natural vibration frequency f;

means for obtaining an eccentricity $\epsilon$R of the shaft bearing portion at the rotational speed R on the basis of the obtained spring stiffness KR at the shaft bearing portion and in accordance with relationship data between the bearing eccentricity $\epsilon$ and the bearing spring stiffness K;

means for converting the obtained bearing eccentricity $\epsilon$R of the bearing portion into an eccentric quantity XR at the bearing portion and further obtaining an eccentric quantity XR' at the shaft displacement measuring position on the basis of the converted eccentric quantity XR at the bearing portion and in accordance with relationship data between the eccentric quantity X at the bearing portion and eccentric quantity X' at the shaft displacement measurement position; and means for assuming an eccentric direction $\theta$R of the eccentric quantity XR' at the shaft displacement measurement position, and correcting the eccentric quantity XR' of the rotor at the rotating center in the shaft displacement measurement position on the basis of the already calculated actual shift quantity LR of the rotor at the rotating center.

6. The apparatus for adjusting an eccentricity of a rotor of claim 5, wherein: shift quantities L1 to Ln are calculated by changing the rotational speed of the rotor; and all the eccentric quantities X1' to Xn' of the rotor at the rotating center in the shaft displacement measurement position at the different rotational speeds are repeatedly corrected by repeatedly assuming the eccentric directions $\theta$R of the eccentric quantities X1' to Xn' at the shaft displacement measurement position where necessary.

7. The apparatus for adjusting an eccentricity of a rotor of claim 5, which further comprises:

means for obtaining a total load FTR to the bearing at the rotational speed R on the basis of the obtained bearing eccentric quantity XR and in accordance with relationship data between the bearing eccentric quantity X and the bearing load F;

means for assuming an initial eccentric quantity $\epsilon$0 of the rotor and obtaining a load FaR due to the initial eccentric quantity $\epsilon$0 in accordance with the relationship data between the bearing eccentric quantity X and the bearing load F;

means for obtaining a fluid load FfR of the rotor by subtracting the initial load FaR from the total load FTR; and means for minimizing the fluid load FfR at a rated rotational speed R by correcting the initial eccentric quantity $\epsilon$0 when necessary.

* * * * *